(12) United States Patent
Brown et al.

(10) Patent No.: US 11,261,997 B2
(45) Date of Patent: Mar. 1, 2022

(54) ANNULAR SAFETY VALVE

(71) Applicant: Halliburton Energy Services, Inc., Houston, TX (US)

(72) Inventors: Irvine Cardno Brown, Aberdeen (GB); Ronald George Taylor, Aberdeen (GB); Katherine Ann Davies, Carnoustie (GB); Peter Derek Walter Inglis, Dundee (GB)

(73) Assignee: Halliburton Energy Services, Inc., Houston, TX (US)

( * ) Notice: Subject to any disclaimer, the term of this patent is extended or adjusted under 35 U.S.C. 154(b) by 107 days.

(21) Appl. No.: 16/655,359

(22) Filed: Oct. 17, 2019

(65) Prior Publication Data

US 2020/0173578 A1 Jun. 4, 2020

Related U.S. Application Data

(60) Provisional application No. 62/773,640, filed on Nov. 30, 2018.

(51) Int. Cl.
*F16K 17/02* (2006.01)
*E21B 34/00* (2006.01)
(Continued)

(52) U.S. Cl.
CPC ............. *F16K 39/02* (2013.01); *E21B 34/08* (2013.01); *F16K 1/42* (2013.01); *F16K 17/02* (2013.01)

(58) Field of Classification Search
CPC .......... F16K 39/02; F16K 17/02; F16K 17/12; F16K 17/164; F16K 15/066; F16K 1/42; F16K 1/34; E21B 2200/02; E21B 33/06
See application file for complete search history.

(56) References Cited

U.S. PATENT DOCUMENTS

| 668,012 | A | * | 2/1901 | Locke | ...................... F16K 1/42 |
| | | | | | 251/333 |
| 2,682,386 | A | * | 6/1954 | Lindsay | .................. F16K 39/02 |
| | | | | | 251/74 |

(Continued)

OTHER PUBLICATIONS

Application No. NL2024074, Office Action, dated Jun. 24, 2020, 10 pages.
(Continued)

*Primary Examiner* — Kelsey E Cary
(74) *Attorney, Agent, or Firm* — Kilpatrick Townsend & Stockton LLP

(57) ABSTRACT

An annular safety valve that is positionable in a wellbore may include a housing having an opening extending through the housing to allow to allow pressure to transmit between a first annular area of the wellbore below the annular safety valve and a second annular area of the wellbore above the annular safety valve. The housing can define the opening by a seat face. A poppet may extend through the opening. A groove may at least partially surrounding the seat face for maintaining a shape of the seat face in response to an increase in pressure in the first area of the wellbore. The shape of the seat face may correspond to a surface of the poppet for preventing pressure from transmitting between the first annular area of the wellbore and the second annular area of the wellbore when the annular safety valve is in a closed position.

18 Claims, 5 Drawing Sheets

(51) Int. Cl.
*F16K 39/02* (2006.01)
*F16K 1/42* (2006.01)
*E21B 34/08* (2006.01)

(56) References Cited

U.S. PATENT DOCUMENTS

| | | | | |
|---|---|---|---|---|
| 2,726,843 | A | * | 12/1955 | Evans ................. F16K 1/42 |
| | | | | 251/333 |
| 3,174,718 | A | * | 3/1965 | McVey ................ F16K 1/34 |
| | | | | 251/334 |
| 4,211,386 | A | * | 7/1980 | Yocum ................ F16K 1/34 |
| | | | | 251/122 |
| 4,949,746 | A | * | 8/1990 | Kay ..................... F15C 3/14 |
| | | | | 137/469 |
| 4,983,927 | A | * | 1/1991 | Torazzina .......... H03G 3/348 |
| | | | | 330/267 |
| 5,211,243 | A | | 5/1993 | Strattan et al. |
| 5,836,395 | A | | 11/1998 | Budde |
| 7,726,026 | B1 | | 6/2010 | Blume |
| 9,494,008 | B2 | | 11/2016 | Pacey |
| 2003/0098074 | A1 | * | 5/2003 | Kayahara .......... F16K 31/0693 |
| | | | | 137/557 |
| 2010/0319924 | A1 | | 12/2010 | Mahmoud et al. |
| 2014/0137957 | A1 | * | 5/2014 | Cunningham ........... F16K 1/34 |
| | | | | 137/543.19 |
| 2015/0152855 | A1 | | 6/2015 | Pessin et al. |
| 2018/0073641 | A1 | * | 3/2018 | Kajio ................... F16K 1/485 |
| 2018/0328142 | A1 | * | 11/2018 | Robert ................ E21B 34/08 |
| 2018/0329435 | A1 | * | 11/2018 | Chalfin ................ F16K 1/42 |
| 2019/0178405 | A1 | * | 6/2019 | Yamauchi ............. F16K 1/42 |
| 2020/0018412 | A1 | * | 1/2020 | Weber ................. F16K 1/427 |
| 2020/0325994 | A1 | * | 10/2020 | Enters ............. F02M 63/0077 |

OTHER PUBLICATIONS

FR1902134 , "Office Action", dated Feb. 6, 2020, 3 pages.
PCT/US2019/056655 , "International Search Report and Written Opinion", dated Feb. 5, 2020, 12 pages.

* cited by examiner

ANNULAR SAFETY VALVE

CROSS REFERENCE TO RELATED APPLICATION

This application claims the benefit of U.S. Provisional Application No. 62/773,640, filed on Nov. 30, 2018, entitled Annular Safety Valve with Groove Around Port, the contents of which is hereby incorporated in its entirety by this reference.

TECHNICAL FIELD

The present disclosure relates generally to an annular safety valve (ASV) that can be positioned downhole within a wellbore, and more particularly (although not necessarily exclusively), to an ASV that includes a groove positioned around a port or an opening of the ASV.

BACKGROUND

An ASV may be a part of a completion string that is positionable downhole in a wellbore. The ASV can actuate between an open and a closed position. The ASV can include a housing having one or more openings for gas injection. The ASV can further include a poppet positioned within the opening. A surface region of the poppet can close or seal against a seat of the opening in the closed position. In the open position, the poppet may not close or seal the opening such that under normal gas injection conditions, the ASV allows gas injection to move past the ASV. In some ASV designs, for example designs in which the ASV has a narrow or slim wall section, the openings in the housing (or ports) can take up a significant proportion of the wall section. This can result in a highly stressed section where the openings are located. The internal pressure trapped below the ASV can create a hoop stress within the wall section as the parts try to expand due to this internal pressure. This expansion can result in distorting the openings and as a result the seat face. The openings can effectively change shape from round to oval, which may cause the poppet(s) to not properly seal to the seat surrounding the opening such that the ASV leaks at higher pressures as the seat no longer matches the poppet geometry.

DETAILED DESCRIPTION

Figure 1:
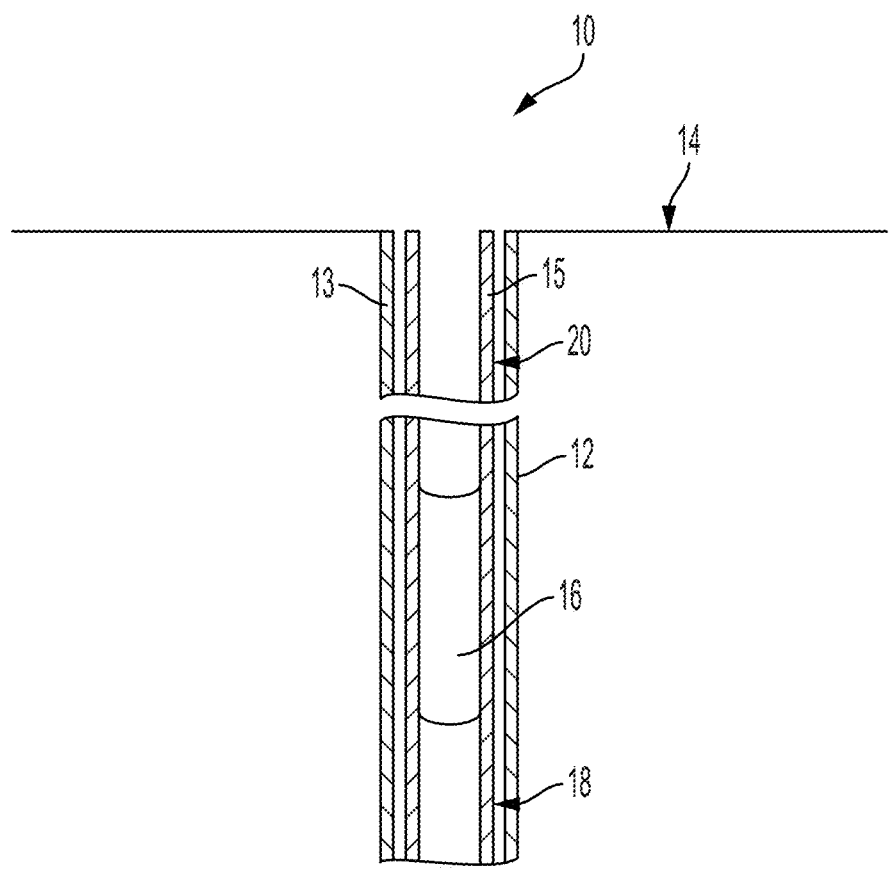
FIG. 1 is a schematic illustration of a well system including an ASV positioned within a wellbore, according to one aspect of the present disclosure.

Certain aspects and features of the present disclosure relate to an ASV that can be positioned in the wellbore. The ASV may be a part of a completion string that is positionable downhole in a wellbore. The ASV can actuate between an open and a closed position. The ASV can include a housing having one or more openings for gas injection. The ASV can further include a poppet positioned within the opening. A surface region of the poppet can close or seal against a seat of the opening in the closed position. The ASV can be actuated to the closed position in response to an emergency situation to shut in injected gas pressure in the annulus of the wellbore for safety reasons. In the closed position, the ASV traps the injection gas pressure in the annulus below the ASV. In the open position, the poppet may not close or seal the opening such that under normal gas injection conditions, the ASV allows gas injection via the annulus to move past the ASV. The position of the poppets of the ASV can be controlled via an actuator within the ASV that may move the poppet (or a set of poppets) off a seat (i.e. move the poppet sealing-face off the seat of the housing) surrounding the opening to position the ASV in the open position. The actuator may be coupled to a control line. The actuator may also move the poppet (or a set of poppets) onto the seat to position the ASV in the closed position. To close the ASV, the control line pressure can be bled off and pressure from a spring can push the poppet(s) (i.e. the poppet sealing-face) back onto the seat, moving the ASV to the closed position and trapping annulus pressure below the ASV. With the ASV in the closed position and pressure trapped below the poppets, the housing can subjected to tubing pressure and axial loading on the poppets.

In some aspects of the present disclosure, the ASV may include a groove (or a recess) around at least part of an outer diameter of a seat of an ASV. The groove may provide an improved metal-to-metal gas seal for the ASV. The groove may be trepanned into the housing proximate to the seat to prevent the seat from changing shape due to pressure below the ASV. Rather than no longer matching the poppet geometry, the seat can maintain shape and close properly regardless of the pressure below the ASV.

In some aspects of the present disclosure, a seat insert may be positioned within the opening and seat region of an ASV. The seat insert may define a surface the poppet of the ASV seals against when the ASV is in the closed position. The seat insert may be formed separately from the housing or may be formed integrally with the housing. The seat insert may move independently from the remainder of the housing such that the seat insert doesn't deform in response to the remainder of the housing deforming. For example, the seat insert may not deform when the remainder of the housing deforms in response to high pressure below the ASV.

Illustrative examples are given to introduce the reader to the general subject matter discussed here and are not intended to limit the scope of the disclosed concepts. The following describes various additional features and examples, but should not be used to limit the present disclosure.

FIG. 1 is a schematic illustration of a well system 10 having a wellbore assembly according to one aspect of the present disclosure. The well system 10 includes a borehole that is a wellbore 12 extending through a surface 14 and various earth strata. The well system 10 may be a land based well system or a sea based well system. A casing string 13 may be positioned within the wellbore 12, and a tubing string 15 may be positioned within the casing string 13. The tubing string 15 may be for example a completion string. The tubing string 15 may include an ASV 16. The ASV 16 may provide a communication path in an annular area between the tubing string 15 and the casing string 13. The ASV 16 may have an open position to allow pressure to transmit between a first annular area 18 of the wellbore 12 (e.g. annular area between the casing string 13 and the tubing string 15) below the ASV 16 and a second annular area 20 of the wellbore (e.g. annular area between the casing string 13 and the tubing string 15) above the ASV 16. The ASV 16 may have a closed position to prevent pressure to transmit between the first annular area 18 of the wellbore 12 below the ASV 16 and the second annular area 20 of the wellbore 12 above the ASV 16.

Figure 2:
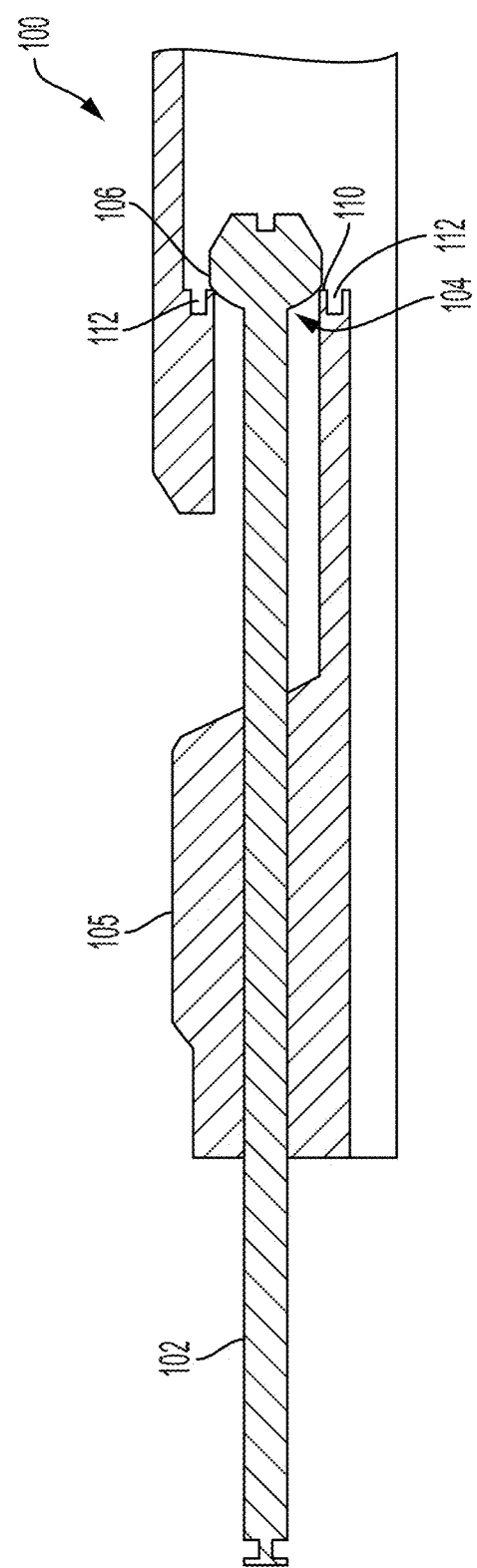
FIG. 2 is a cross-sectional side view of part of an ASV, according to one aspect of the present disclosure.

FIG. 2 is a cross-sectional side view of part of an ASV 100 according to an example of the present disclosure. The ASV 100, which could for example be the ASV 16, includes a poppet 102 seated in an opening 104 of a housing 105. The ASV 100 is depicted in a closed position in FIG. 2. As shown in FIG. 2, in the closed position, a sealing face 106 of the poppet 102 interfaces (or contacts) a seat 110 of the housing 105 such that the poppet 102 is sealed against the seat 110 for trapping injected gas pressure in the annulus of the well below the closed ASV 100. In some aspects of the present disclosure, the ASV 100 also includes a groove or recess 112 that at least partially surrounds the seat 110 of the ASV. When the ASV 100 is in the closed position (as shown in FIG. 2), a pressure applied in the annulus below the ASV 100 does not pass through the opening 104 that is sealed by the poppet 102 of the ASV 100.

The groove 112 can isolate the seat 110 of the housing 105 against which the poppet 102 seats or seals from the influence of a deformation in the housing 105 due to internal pressure below the ASV 100. Without the groove 112, increased pressure in the annulus below the ASV 100 can cause hoop stress within the housing 105 to cause the housing 105 to deform unevenly around the opening which may cause the seat 110 to also deform unevenly. An uneven deformation of the seat 110 can cause the geometry of the seat 110 to no longer match the geometry of the poppet 102, in particular the sealing face 106 of the poppet 102 such that the poppet 102 does not seal against the seat 110 in the closed position. The groove 112 can prevent the uneven deformation of the seat 110 and provide for improved sealing between the poppet 102 and the seat 110 even when increased pressure below the ASV may cause the housing 105 to deform. The groove 112, for example, may provide a space within which the housing 105 may deform without causing any deformation to the shape of the seat 110. The groove 112 may be trepanned, it may be 3D printed as a part of the housing 105, it may be formed via spark eroding or other suitable methods.

Figure 3A:
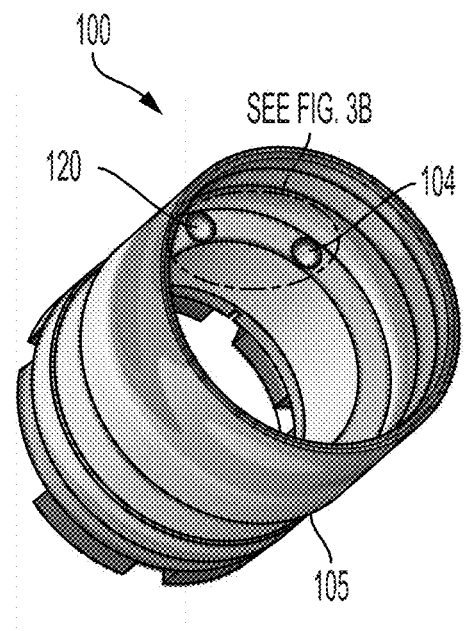
FIG. 3A is perspective view of a part of the ASV of FIG. 2, according to one aspect of the present disclosure.
Figure 3B:
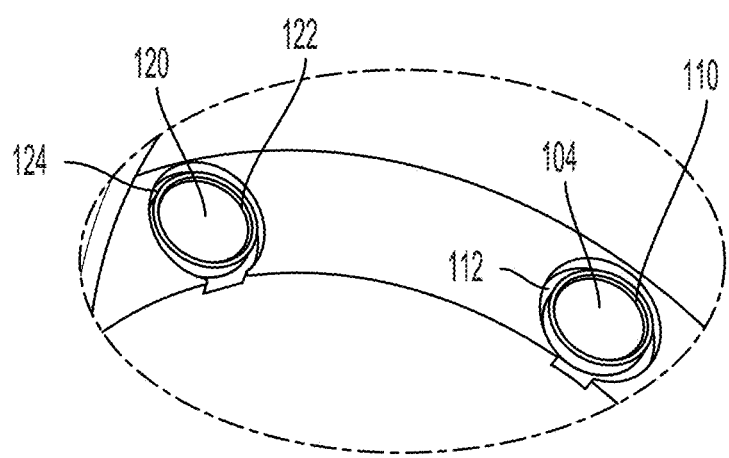
FIG. 3B is an enlarged perspective view of part of the ASV shown in FIG. 3A, according to one aspect of the present disclosure.

FIG. 3A is a perspective view of a portion of the housing 105 of the ASV 100 shown in FIG. 2. While FIG. 3A depicts two openings 104, 120 in the housing 105, more or fewer openings (and corresponding poppets) may be used. The openings 104, 120 may be axial openings for gas injection according to an example of the present disclosure. The openings 104, 120 may also be referred to as ports. FIG. 3B also depicts an enlarged view of the openings 104, 120, seats 110, 122, and grooves 112, 124. Seats 110, 122 surround the openings 104, 120 for receiving and sealing against respective poppets (not shown for ease of viewing the openings 104, 120 and seats 110, 122) of the ASV 100. Grooves or recesses 112, 124, are positioned around seats 110, 122. Though the grooves 112, 124 are shown as extending entirely around the seats 110, 122 in FIGS. 3A, 3B, in some examples the grooves 112, 124, may only extend partially around the seats 110, 122. In some aspects, one or more grooves may extend around at least partially around the seats 110, 122, for example two grooves may together partially encircle a seat. In some examples, the grooves 112, 124 can be formed by a trepanning process, though other suitable methods for creating the grooves 112, 124 may be used in other examples. In addition, though the grooves 112, 124, are shown as having a generally rectangular cross section in some examples the grooves 112, 124 may have a different cross-sectional shape.

As described above with respect to FIG. 2, the grooves 112, 124 can separate a portion of the seats 110, 122 from the other portions of the housing 200. The separation between the seat 110, 122 and other portions of the housing 105 can allow the housing 105 to deform into the groove 112, 124 in response to pressure, without affecting the shape or size of the openings 104, 120, or the seats 110, 122. For example, the grooves 112, 124 can isolate a sealing face of the seats 110, 122 that contacts and seals against a poppet (not shown) from the influence of the remainder of the housing 105 expanding due to internal tubing pressure or annular pressure below the ASV 100. Thus, the grooves 112, 124 can provide a certain amount of flexibility to the respective seats 110, 122 and allow the portions of the respective seats 110, 122 that seal against the poppets to retain their shapes. The sealing between the poppets and the respective seats 110, 122 can be improved and gas leakage between the poppets and the respective seats 110, 122 when the ASV 100 is in a closed position can be reduced by providing the grooves 112, 124.

Figure 4:
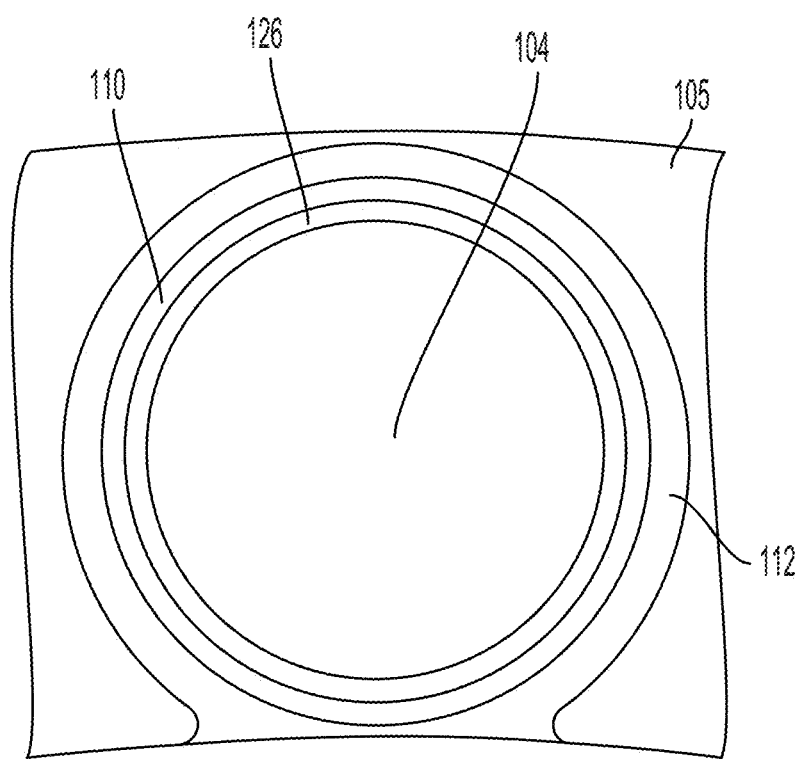
FIG. 4 is a top view of part of the ASV of FIGS. 3A, 3B, according to one aspect of the present disclosure.

FIG. 4 is a top plan view of a portion of the housing 105 of FIGS. 2, 3A and 3B that includes the seat 110 surrounding the opening 104. The seat 110 includes a seat face 126 which contacts, interfaces, or seals with a surface of a poppet (not shown for ease of viewing the opening 104, seat 110, and seat face 126) that extends within the housing 105. FIG. 4 further depicts the groove 112 extending around the seat 110, according to one example of the present disclosure. The groove 112 may be a trepanned groove. The groove 112 can isolate the seat 110, including the seat face 126, from a grown or deformation of a remaining portion of the housing 105 when the housing 105 is subjected to internal pressure. In addition, the groove 112 can provide the seat face 126 a degree of freedom or flexibility to allow the seat face 126 to maintain the same geometry as the surface of the poppet that contacts, interfaces, or seals against the seat face 126, therefore maintaining metal-to-metal seal between the seat face 126 and the poppet at high pressure.

Figure 5:
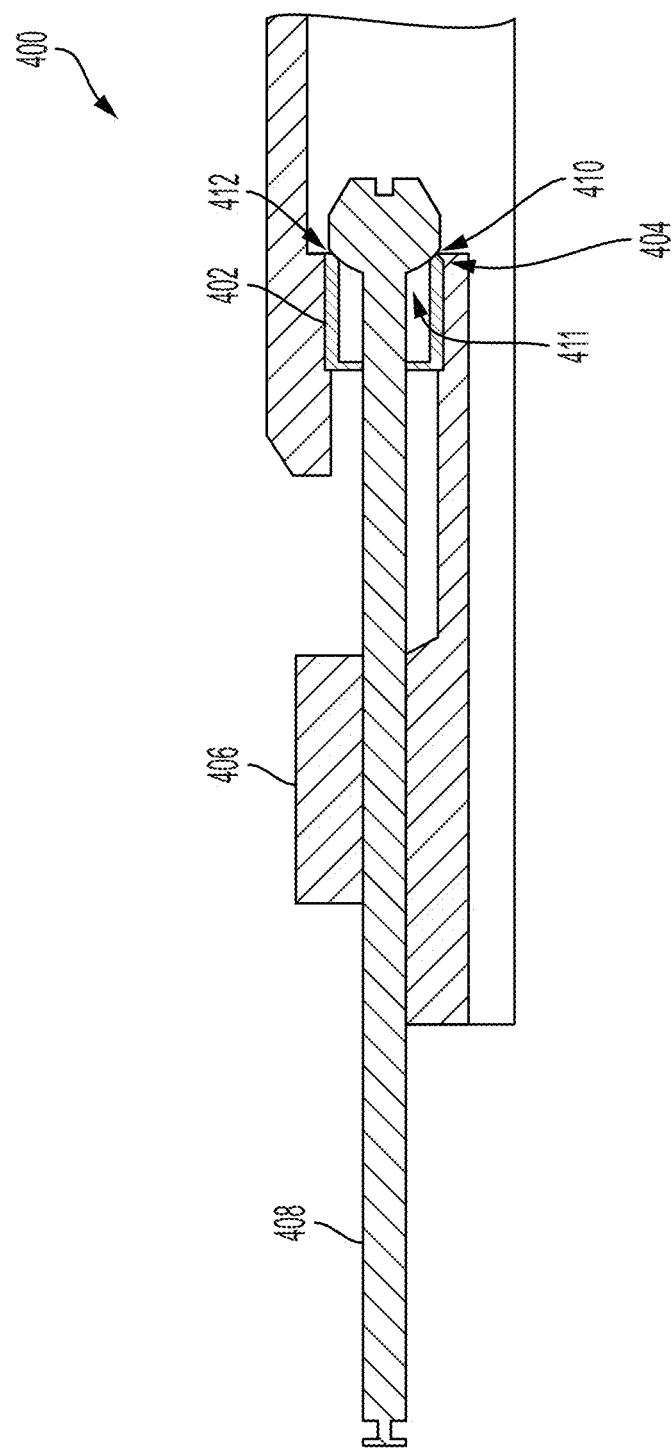
FIG. 5 is a cross-sectional side view of part of an ASV, according to one aspect of the present disclosure.

FIG. 5 depicts a portion of an ASV 400 according to an aspect of the present disclosure in which a seat insert 402 is provided about a seat 404 of the housing 406. A poppet 408 of the ASV 400 includes a sealing face 412 that contacts, interfaces with, or seals against a seat face 410 of the seat insert 402. The seat insert 402 may have an interference fit within an opening or port 411 of the housing 406. In some aspects, the seat insert 402 may be press fit within the opening or port 411 of the housing 406. In some aspects, the seat insert 402 may be shrink fit within the opening or port 411 of the housing 406. The seat insert 402 can be the same material as the housing 406 or may be a different material including but not limited to a metallic material, a polymer material, or another suitable material for providing a seal between the seat insert 402 and the sealing face 412 of the poppet 408. In some aspects, the seat insert 402 may comprise an Inconel Alloy 718 (UNS No. 7718) with a minimum yield strength of 125,000 lbs/in$^2$ and a maximum hardness of 40 Rc, though other materials may be used. The seat insert 402 may extend above the opening 411. The seat insert 402 may be formed independently from the housing 406 such that the seat insert 402 may comprise a different material than the housing 406. For example, the housing 406 may comprise a material having a lower yield strength than the material that forms the seat insert 402. In some aspects, the seat insert 402 may be shrink fit or cryogenically fitted into the housing 406. In response to high pressure below the ASV 400 the housing 406 may deform while the seat insert 402 may not be deformed such that the poppet 408 may continue to contact, interface with, or seal against the seat face 410 of the seat insert 402. The seat insert 402 may not deform in response to a deformation of the housing 406. By maintaining the shape of the seat insert 402 when the housing 406 deforms the poppet 408 may continue to contact, interface with, or seal against the seat insert 402. Providing for a consistent seal between the seat insert 402 and the poppet 408 can improve the functionality of the ASV 400 over time when the ASV 400 may experience changes to the shape of its housing 406 in response to high pressure below the seat insert 402. In some aspects of the present disclosure the seat insert 402 may be used together with a groove surrounding the seat 404, or in other aspects (as shown in FIG. 5) the seat insert 402 may be used without a groove.

As used below, any reference to a series of examples is to be understood as a reference to each of those examples disjunctively (e.g., "Examples 1-4" is to be understood as "Examples 1, 2, 3, or 4").

Example 1 is an annular safety valve positionable in a wellbore, the annular safety valve comprising: a housing having an opening extending through the housing to allow to allow pressure to transmit between a first annular area of the wellbore below the annular safety valve and a second annular area of the wellbore above the annular safety valve, wherein the housing defines the opening by a seat face; a poppet extending through the opening; and a groove at least partially surrounding the seat face for maintaining a shape of the seat face in response to an increase in pressure in the first annular area of the wellbore, wherein the shape of the seat face corresponds to a surface of the poppet for preventing pressure from transmitting between the first annular area of the wellbore and the second annular area of the wellbore when the annular safety valve is in a closed position.

Example 2 is the annular safety valve of example(s) 1, further comprising: a second opening, wherein the housing defines the second opening by a second seat face; a second poppet extending through the second opening; and a second groove at least partially surrounding the second seat face for maintaining a shape of the second seat face in response to an increase in pressure in the first annular area of the wellbore, wherein the shape of the second seat face corresponds to a surface of the second poppet for preventing pressure from transmitting between the first annular area of the wellbore and the second annular area of the wellbore when the annular safety valve is in the closed position.

Example 3 is the annular safety valve of example(s) 1-2, wherein the groove surrounds the seat face entirely.

Example 4 is the annular safety valve of example(s) 1-3, wherein the groove is a trepanned groove.

Example 5 is the annular safety valve of example(s) 1-4, further comprising at least two additional openings, each opening of the two additional openings is associated with a respective groove at least partially surrounding each of the at least two additional openings.

Example 6 is the annular safety valve of example(s) 1-5, further comprising a seat insert positioned within opening, the seat insert having a seat face for maintaining a shape of the seat face in response to an increase in pressure in the first annular area of the wellbore, wherein the shape of the seat face corresponds to a surface of the poppet for preventing pressure from transmitting between the first annular area of the wellbore and the second annular area of the wellbore when the annular safety valve is in a closed position in response to an increase in pressure in the first annular area of the wellbore.

Example 7 is an annular safety valve positionable in a wellbore, the annular safety valve comprising: a housing having an opening extending through the housing to allow pressure to transmit between a first annular area of the wellbore below the annular safety valve and a second annular area of the wellbore above the annular safety valve; and a poppet extending through the opening; at least one of (a) a seat insert positioned within opening, the seat insert having a sealing surface for maintaining a shape of the sealing surface in response to an increase in pressure in the first annular area of the wellbore, wherein the shape of the sealing surface corresponds to a surface of the poppet for preventing pressure from transmitting between the first annular area of the wellbore and the second annular area of the wellbore when the annular safety valve is in a closed position in response to an increase in pressure in the first annular area of the wellbore, or (b) a groove at least partially surrounding the opening for maintaining a shape of the seat face in response to an increase in pressure in the first annular area of the wellbore, wherein the shape of the seat face corresponds to a surface of the poppet for preventing pressure from transmitting between the first annular area of the wellbore and the second annular area of the wellbore when the annular safety valve is in a closed position.

Example 8 is the annular safety valve of example(s) 7, further comprising: a second opening in the housing; a second poppet extending through the second opening; and a second seat insert positioned within second opening, the second seat insert having a second sealing surface for maintaining a shape of the second seat face in response to an increase in pressure in the first annular area of the wellbore, wherein the shape of the second sealing surface corresponds to a surface of the second poppet for preventing pressure from transmitting between the first annular area of the wellbore and the second annular area of the wellbore when the annular safety valve is in the closed position.

Example 9 is the annular safety valve of example(s) 7-8, further comprising at least two additional openings, each opening of the two additional openings is associated with a respective seat insert extending within each opening of the at least two additional openings.

Example 10 is the annular safety valve of example(s) 7-8, wherein the housing comprises a first material and wherein the seat insert comprises the first material.

Example 11 is the annular safety valve of example(s) 7-10, wherein the housing comprises a first material and wherein the seat insert comprises a second material that is different from the first material.

Example 12 is the annular safety valve of example(s) 11, wherein the first material has a lower yield strength than the second material.

Example 13 is the annular safety valve of example(s) 7-12 wherein the seat insert comprises a polymer material.

Example 14 is the annular safety valve of example(s) 7-12, wherein the seat insert comprises a metallic material.

Example 15 is the annular safety valve of example(s) 7-14, wherein the sealing surface of the seat insert has a concave shape and wherein the surface of the poppet has a convex shape.

Example 16 is the annular safety valve of example(s) 7-15, further comprising a groove at least partially surrounding the opening for aiding in maintaining the shape of the sealing surface in response to an increase in pressure in the first annular area of the wellbore.

Example 17 is a downhole assembly positionable within a casing string of a wellbore comprising: a completion string including an annular safety valve, wherein the annular safety valve further comprises: a housing having a plurality of openings extending through the housing to allow to allow pressure to transmit between a first annular area of the wellbore below the annular safety valve and a second annular area of the wellbore above the annular safety valve, a plurality of seat faces, each seat face of the plurality of seat faces defining an opening of the plurality of openings; a plurality of poppets, each poppet of the plurality of poppets extending through a respective opening of the plurality of openings, wherein each poppet of the plurality of poppets has a surface that corresponds to a surface of each respective seat face for preventing pressure from transmitting between the first annular area of the wellbore and the second annular area of the wellbore when the annular safety valve is in a closed position; and a plurality of grooves, each groove of the plurality of grooves extending at least partially around a respective seat face of the plurality of seat faces for maintaining a shape of the respective seat face in response to an increase in pressure in the first annular area of the wellbore.

Example 18 is the downhole assembly of example(s) 17, wherein each of the grooves of the plurality of grooves extends entirely around the respective seat face of the plurality of seat faces.

Example 19 is the downhole assembly of example(s) 17, wherein at least one of the grooves of the plurality of grooves extends only partially around at least one respective seat face of the plurality of seat faces.

Example 20 is the downhole assembly of example(s) 17, wherein each of the grooves of the plurality of grooves is a trepanned groove.

The foregoing description of certain embodiments, including illustrated embodiments, has been presented only for the purpose of illustration and description and is not intended to be exhaustive or to limit the disclosure to the precise forms disclosed. Numerous modifications, adaptations, combinations, and uses thereof are possible without departing from the scope of the disclosure.

What is claimed is:

1. An annular safety valve positionable in a wellbore, the annular safety valve comprising:
    a housing having an opening extending through the housing to allow to allow pressure to transmit between a first annular area of the wellbore below the annular safety valve and a second annular area of the wellbore above the annular safety valve, wherein the housing defines the opening by a seat face;
    a poppet extending through the opening; and
    a groove at least partially surrounding the seat face for maintaining a shape of the seat face in response to an increase in pressure in the first annular area of the wellbore, wherein the shape of the seat face corresponds to a surface of the poppet for preventing pressure from transmitting between the first annular area of the wellbore and the second annular area of the wellbore when the annular safety valve is in a closed position.

2. The annular safety valve of claim 1, further comprising:
    a second opening, wherein the housing defines the second opening by a second seat face;
    a second poppet extending through the second opening; and
    a second groove at least partially surrounding the second seat face for maintaining a shape of the second seat face in response to an increase in pressure in the first annular area of the wellbore,
    wherein the shape of the second seat face corresponds to a surface of the second poppet for preventing pressure from transmitting between the first annular area of the wellbore and the second annular area of the wellbore when the annular safety valve is in the closed position.

3. The annular safety valve of claim 1, wherein the groove surrounds the seat face entirely.

4. The annular safety valve of claim 1, wherein the groove is a trepanned groove.

5. The annular safety valve of claim 1, further comprising at least two additional openings, each opening of the two additional openings is associated with a respective groove at least partially surrounding each of the at least two additional openings.

6. An annular safety valve positionable in a wellbore, the annular safety valve comprising:
    a housing having an opening defined by a seat face, the opening extending through the housing to allow pressure to transmit between a first annular area of the wellbore below the annular safety valve and a second annular area of the wellbore above the annular safety valve; and
    a poppet extending through the opening; and
    at least one of (a) a seat insert positioned within opening, the seat insert having a sealing surface, wherein the shape of the sealing surface corresponds to a surface of the poppet for preventing pressure from transmitting between the first annular area of the wellbore and the second annular area of the wellbore when the annular safety valve is in a closed position in response to an increase in pressure in the first annular area of the wellbore, or
    (b) a groove at least partially surrounding the opening for maintaining a shape of the seat face in response to an increase in pressure in the first annular area of the wellbore, wherein the shape of the seat face corresponds to a surface of the poppet for preventing pressure from transmitting between the first annular area of the wellbore and the second annular area of the wellbore when the annular safety valve is in a closed position.

7. The annular safety valve of claim 6, further comprising:
    a second opening in the housing;
    a second poppet extending through the second opening; and
    a second seat insert positioned within second opening, the second seat insert having a second sealing surface for maintaining a shape of the second sealing surface in response to an increase in pressure in the first annular area of the wellbore,
    wherein the shape of the second sealing surface corresponds to a surface of the second poppet for preventing pressure from transmitting between the first annular area of the wellbore and the second annular area of the wellbore when the annular safety valve is in the closed position.

8. The annular safety valve of claim 6, further comprising at least two additional openings, each opening of the two additional openings is associated with a respective seat insert extending within each opening of the at least two additional openings.

9. The annular safety valve of claim 6, wherein the housing comprises a first material and wherein the seat insert comprises the first material.

10. The annular safety valve of claim 6, wherein the housing comprises a first material and wherein the seat insert comprises a second material that is different from the first material.

11. The annular safety valve of claim 10, wherein the first material has a lower yield strength than the second material.

12. The annular safety valve of claim 6, wherein the seat insert comprises a polymer material.

13. The annular safety valve of claim 6, wherein the seat insert comprises a metallic material.

14. The annular safety valve of claim 6, wherein the seat face of the seat insert has a concave shape and wherein the surface of the poppet has a convex shape.

15. A downhole assembly positionable within a casing string of a wellbore comprising:
   a completion string including an annular safety valve, wherein the annular safety valve further comprises:
      a housing having a plurality of openings extending through the housing to allow pressure to transmit between a first annular area of the wellbore below the annular safety valve and a second annular area of the wellbore above the annular safety valve,
      a plurality of seat faces, each seat face of the plurality of seat faces defining an opening of the plurality of openings;
      a plurality of poppets, each poppet of the plurality of poppets extending through a respective opening of the plurality of openings, wherein each poppet of the plurality of poppets has a surface that corresponds to a surface of each respective seat face for preventing pressure from transmitting between the first annular area of the wellbore and the second annular area of the wellbore when the annular safety valve is in a closed position; and
      a plurality of grooves, each groove of the plurality of grooves extending at least partially around a respective seat face of the plurality of seat faces for maintaining a shape of the respective seat face in response to an increase in pressure in the first annular area of the wellbore.

16. The downhole assembly of claim 15, wherein each of the grooves of the plurality of grooves extends entirely around the respective seat face of the plurality of seat faces.

17. The downhole assembly of claim 15, wherein at least one of the grooves of the plurality of grooves extends only partially around at least one respective seat face of the plurality of seat faces.

18. The downhole assembly of claim 15, wherein each of the grooves of the plurality of grooves is a trepanned groove.

\* \* \* \* \*